United States Patent [19]

Goto et al.

[11] Patent Number: 5,333,846

[45] Date of Patent: * Aug. 2, 1994

[54] ELASTIC MOUNT HAVING FLUID CHAMBER PARTIALLY DEFINED BY OSCILLATING PLATE ACTUATED BY MOVING COIL IN ANNULAR GAP BETWEEN TWO YOKES CONNECTED TO PERMANENT MAGNET, AND METHOD OF MANUFACTURING THE ELASTIC MOUNT

[75] Inventors: Katsuhiro Goto, Komakia; Akiyoshi Ide, Inuyama; Yutaka Ishioka, Nagoya; Rentaro Kato; Tetsu Matsui, both of Kasugai; Ryouji Kanda, Komaki; Atsushi Muramatsu, Komaki; Keiichi Ishiba, Komaki; Yoshiki Funahashi, Iwakura, all of Japan

[73] Assignee: Tokai Rubber Industries, Ltd., Japan

[ * ] Notice: The portion of the term of this patent subsequent to Oct. 5, 2010 has been disclaimed.

[21] Appl. No.: 979,934

[22] Filed: Nov. 23, 1992

[30] Foreign Application Priority Data

Nov. 28, 1991 [JP] Japan .................. 3-339876
Nov. 29, 1991 [JP] Japan .................. 3-341930
Dec. 6, 1991 [JP] Japan .................. 3-349585

[51] Int. Cl.$^5$ .......................... F16F 9/44; H01F 7/06
[52] U.S. Cl. .................... 267/140.14; 267/140.15; 29/607
[58] Field of Search ............ 267/140.13–140.15, 267/219; 29/607; 248/562, 636

[56] References Cited

U.S. PATENT DOCUMENTS

| | | | |
|---|---|---|---|
| 2,306,291 | 12/1942 | Alons | 29/607 X |
| 2,952,803 | 9/1960 | Charles et al. | 29/607 |
| 3,219,889 | 11/1965 | Polushkin | 29/607 |
| 4,289,937 | 9/1981 | Ikeda et al. | 29/607 X |
| 4,635,910 | 1/1987 | Ozawa et al. | 267/140.15 X |
| 4,650,170 | 3/1987 | Fakushima | 248/562 X |
| 4,693,455 | 9/1987 | Andrä | 267/140.1 |
| 4,872,652 | 10/1989 | Rohner et al. | 248/562 X |
| 5,047,743 | 9/1991 | Scesney | 29/607 X |

FOREIGN PATENT DOCUMENTS

| | | |
|---|---|---|
| 3619685 | 12/1987 | Fed. Rep. of Germany ............ 267/140.15 |
| 59-1828 | 1/1984 | Japan . |
| 59-1829 | 1/1984 | Japan . |
| 60-8540 | 1/1985 | Japan . |
| 3-73741 | 7/1991 | Japan . |

Primary Examiner—Robert J. Oberleitner
Assistant Examiner—Alfred Muratori
Attorney, Agent, or Firm—Parkhurst, Wendel & Rossi

[57] ABSTRACT

A fluid-filled elastic mount wherein an elastic body elastically connecting a first and a second support partially defines a fluid chamber filled with a non-compressible fluid. The elastic mount includes an oscillating plate which partially defines the fluid chamber and which is displaceable to change a pressure of the fluid in the fluid chamber, and a permanent magnet disposed on one of opposite sides of the oscillating plate remote from the fluid chamber. A first and a second yoke member are connected to opposite magnetic pole faces of the magnet and cooperate with the magnet to define a closed magnetic circuit. The yoke members define therebetween an annular gap in the magnetic circuit, in which an annular moving coil is received. The coil is fixed to the oscillating plate, to oscillate the oscillating plate upon energization of the coil. Also disclosed is a method of manufacturing the elastic mount, in which a blank for the magnet is magnetized together with the yoke members after the blank and yoke members are assembled into a unit.

28 Claims, 11 Drawing Sheets

ELASTIC MOUNT HAVING FLUID CHAMBER PARTIALLY DEFINED BY OSCILLATING PLATE ACTUATED BY MOVING COIL IN ANNULAR GAP BETWEEN TWO YOKES CONNECTED TO PERMANENT MAGNET, AND METHOD OF MANUFACTURING THE ELASTIC MOUNT

BACKGROUND OF THE INVENTION

1. Field of the Invention

The present invention relates generally to a fluid-filled elastic mount used as a vibration damper such as an engine mount for a motor vehicle, and more particularly to such a fluid-filled elastic mount having a fluid chamber partially defined by an oscillating plate which is actuated by an electromagnetic drive device so as to electrically control the damping characteristics of the mount. The present invention is also concerned with a method of manufacturing the fluid-filled elastic mount having an electromagnetic drive device capable of producing a large drive force to actuate the oscillating plate.

2. Discussion of the Prior Art

As a vibration damper such as an engine mount for a motor vehicle, for flexibly connecting two members in a vibration system or mounting one of the two members on the other member in a vibration damping fashion, there is known an elastic mount interposed between the two members of the vibration system. The elastic mount has an elastic body interposed between and elastically connecting a first and a second support, which are spaced apart from each other in a load receiving direction in which a vibrational load is applied to the mount. The first and second supports are secured to the respective ends of the elastic body which are opposed to each other in the load receiving direction, and are fixed to one and the other of the two members of the vibration system. This type of elastic mount may be used as a suspension bushing for the motor vehicle, as well as the engine mount indicated above.

Recently, there have been proposed various types of fluid-filled elastic mounts adapted to exhibit sophisticated damping characteristics, wherein the elastic body which elastically connects the first and second supports partially defines a fluid chamber filled with a non-compressible fluid. Some of these fluid-filled elastic mounts are adapted to electrically control the fluid pressure within the fluid chamber, depending upon the type of the input vibrations received, so that the specific vibrations can be suitably damped or isolated.

Examples of such electrically controllable fluid-filled elastic mount are disclosed in JP-A-60-8540, JP-A-59-1828 and JP-A-59-1829, wherein the fluid chamber is partially defined by an oscillating plate which consists of a magnetic body or a permanent magnet. The oscillating plate is actuated by a solenoid coil, so as to produce pressure pulsation within the fluid chamber to thereby control the fluid pressure within the chamber. Another type of electrically controllable fluid-filled elastic mount is disclosed in Publication No. 3-73741 of Japanese Utility Model Application, wherein the fluid chamber is partially defined by an oscillating plate fixed to one of an annular permanent magnet and an annular coil which is disposed radially inward or outward of and concentrically with the permanent magnet. The oscillating plate is oscillated by an electromagnetic force produced upon energization of the coil, so as to suitably control the fluid pressure within the fluid chamber.

In the known electrically controllable fluid-filled elastic mount constructed as described above, the operation of the oscillating plate cannot be suitably regulated so as to enable the elastic mount to exhibit satisfactory damping characteristics, since it is difficult to obtain a sufficient drive force to effectively and stably actuate the oscillating plate.

Described more specifically, the above fluid-filled elastic mount suffers from insufficiency of the magnetic flux density in the magnetic field in which the oscillating plate or solenoid coil is placed, because the magnetic path or circuit formed by the solenoid or permanent magnet is open. In particular, the open magnetic circuit leads to insufficiency of the drive force to actuate the oscillating plate so as to effectively regulate the fluid pressure within the fluid chamber, when the elastic mount receives a vibrational load of medium to low frequencies having a relatively large amplitude. Further, the electromagnetic drive device including the solenoid coil and permanent magnet tends to be large-sized, thereby resulting in the elastic mount having a relatively large size.

Moreover, when the oscillating plate is actuated or displaced in the oscillating manner, the open magnetic circuit formed by the solenoid or permanent magnet inevitably causes a large variation in the magnetic flux density in the field in which the oscillating plate or coil is placed. As a result, the drive force which acts on the oscillating plate tends to be unstable, making it difficult to effectively control the oscillating plate, whereby the waveform of the pulsation induced within the fluid chamber is distorted, causing a fluid pressure control distortion of the fluid chamber. Thus, the known electrically controllable fluid-filled elastic mount is not satisfactory in terms of its damping characteristics.

Although the oscillating plate can be suitably controlled to regulate the fluid pressure within the fluid chamber so as to exhibit an intended damping effect with respect to the vibrations in a specific frequency band, the distortion of the pulsation waveform of the fluid would result in adversely amplifying the vibrations in another frequency band. Thus, the known fluid-filled elastic mount as a whole is incapable of exhibiting the intended damping characteristics over a wide range of frequency of the input vibrations.

SUMMARY OF THE INVENTION

It is therefore a first object of the present invention to provide an electrically controllable fluid-filled elastic mount having an oscillating plate partially defining a fluid chamber, which elastic mount is provided with an electromagnetic drive device capable of effectively actuating the oscillating plate, with a sufficient drive force and a reduced amount of distortion of the fluid pressure pulsation in the fluid chamber.

A second object of the invention is to provide a method of manufacturing such an electrically controllable fluid-filled elastic mount, which method permits the electromagnetic drive device to assure a sufficiently large drive force to actuate the oscillating plate, with a constant magnetic flux density in the magnetic field.

The first object may be achieved according to one aspect of the present invention, which provides a fluid-filled elastic mount comprising: a first and a second support which are spaced apart from each other; an elastic body which is interposed between the first and second supports for elastically connecting the first and second supports and which partially defines a fluid chamber filled with a non-compressible fluid; an oscillating plate which partially defines the fluid chamber and which is displaceable to change a pressure of the fluid in the fluid chamber; a permanent magnet disposed on one of opposite sides of the oscillating plate remote from the fluid chamber; a first and a second yoke member which are connected to respective opposite magnetic pole faces of the permanent magnet and which cooperate with the permanent magnet to define a closed magnetic circuit, the first and second yoke members defining therebetween an annular gap in the magnetic circuit; and an annular moving coil received in the annular gap and fixed to the oscillating plate. The moving coil is displaced in the annular gap in an axial direction thereof, to oscillate the oscillating plate upon energization of the moving coil.

In the fluid-filled elastic mount of the present invention constructed as described above, the annular moving coil is disposed in the annular gap defined by and between the first and second yoke members, which cooperate with the magnet to define a closed magnetic circuit or path. Accordingly, the present arrangement is effective to minimize the amount of leakage of the magnetic flux, thereby increasing the magnetic flux density at the annular gap and improving the uniformity of the magnetic flux density.

Consequently, the moving coil is exposed to a sufficiently high density of magnetic flux, whereby an accordingly large magnetic force is produced to move the coil upon energization of the coil, irrespective of the axial position of the coil which varies over a predetermined range of operating stroke. This means a large drive force to oscillate the oscillating plate, assuring increased operating stability of the oscillating plate.

The increased operating stability of the oscillating plate with a large drive force assures improved accuracy and stability of regulation of the fluid pressure in the fluid chamber, and enhanced damping characteristics of the elastic mount.

The permanent magnet may be a solid cylinder. In this case, the annular gap is formed radially outwardly of the solid cylinder. In this arrangement, the first yoke member may comprise a base member including a bottom wall portion and a cylindrical wall portion which cooperate to define a cylindrical space, and the second yoke member may comprise a circular disk disposed radially inwardly of the cylindrical wall portion. In this instance, the solid cylinder is disposed within the cylindrical space such that one of opposite axial ends of the solid cylinder of the permanent magnet is in contact with the bottom wall portion of the base member while the other of the opposite axial ends is in contact with the circular disk.

Alternatively, the permanent magnet may be an annular magnet having a center bore. In this case, the annular gap is formed radially inwardly of an inner circumferential surface of the annular magnet. In this arrangement, the first yoke member may include a base plate portion and a cylinder portion which extends through the center bore of the annular magnet, from a central part of the base plate portion, and the second yoke member may comprise an annular member. The base plate portion has an outer annular part in contact with one of opposite axial ends of the annular magnet, and the annular member of the second yoke member is in contact with the other of the opposite axial ends of the annular magnet. The annular member has an inner circumferential surface which cooperates with an outer circumferential surface of the cylinder portion of the first yoke member to define therebetween the annular gap.

In the above form of the elastic mount wherein the annular permanent magnet is used and the annular gap is formed radially inwardly of the annulus of the annular magnet, the magnetic force to be produced is further increased due to a relatively large diameter and a relatively large effective cross sectional area of the annular magnet. Further, the magnetic flux is formed within the annular magnet, assuring a relatively high density of the magnetic flux at the annular gap within the annular magnet.

The second object indicated above may be achieved according to a second aspect of this invention, which provides a method of manufacturing a fluid-filled elastic mount including (a) a first and a second support which are spaced apart from each other; (b) an elastic body which is interposed between the first and second supports for elastically connecting the first and second supports and which partially defines a fluid chamber filled with a non-compressible fluid; (c) an oscillating plate which partially defines the fluid chamber and which is displaceable to change a pressure of the fluid in the fluid chamber; (d) a permanent magnet disposed on one of opposite sides of the oscillating plate remote from the fluid chamber; (e) a first and a second yoke member which are connected to respective opposite magnetic pole faces of the permanent magnet, the first and second yoke members defining therebetween an annular gap in the magnetic circuit; and (f) an annular moving coil received in the annular gap and fixed to the oscillating plate, the moving coil being displaced in the annular gap in an axial direction thereof, to oscillate the oscillating plate upon energization of the moving coil, the method comprising the steps of: assembling a blank for the permanent magnet, and the first and second yoke members, to prepare an unmagnetized magnet assembly wherein the blank and the first and second yoke members cooperate to define a closed path and the yoke members define the annular gap; and magnetizing the blank into the permanent magnet.

According to the method of the present invention, the annular gap in which the annular coil is received is defined by and between the first and second yoke members, which cooperate with the permanent magnet to define the closed magnetic circuit or path. Therefore, the present method provides the same advantages as described with respect to the elastic mount per se. Moreover, the blank for the magnet is magnetized together with the first and second yoke members, after these yoke members and the blank are assembled together into the unmagnetized magnet assembly. This procedure of magnetizing the blank into the permanent magnet permits increased magnetic force and magnetic flux density at the annular gap, thereby assuring increased magnetic force to move the coil to oscillate the oscillating plate with high stability, whereby the damping characteristics of the elastic mount is accordingly improved.

Further, the blank for the permanent magnet is assembled with respect to the first and second yoke members, the assembling procedure would not be disturbed by a large magnetic force of the permanent magnet. Thus, the unmagnetized magnet assembly is readily prepared with high efficiency, before the unmagnetized magnet assembly is magnetized.

To magnetize the blank, a coil may be disposed around the blank and energized with an electric current applied thereto. The blank and the first and second yoke members are preferably made of ferromagnetic materials. In particular, an iron or steel alloy or ferrite is preferred for the blank.

BRIEF DESCRIPTION OF THE DRAWINGS

The above and other objects, features and advantages of the present invention will be better understood by reading the following detailed description of the preferred embodiments of the invention, when considered in connection with the accompanying drawings, in which.

DETAILED DESCRIPTION OF THE PREFERRED EMBODIMENTS

Figure 1:
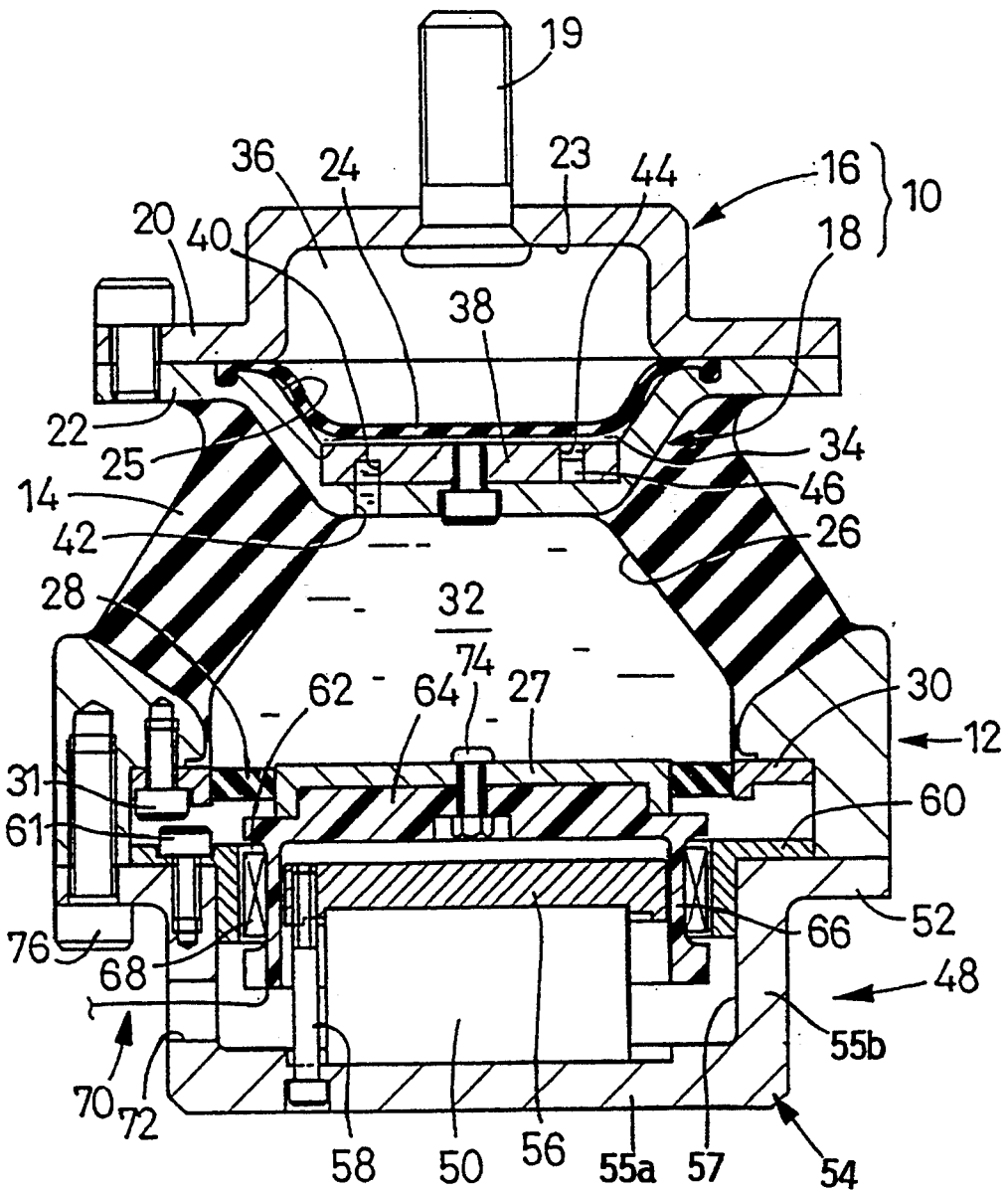
FIG. 1 is an elevational view in axial cross section of one embodiment of a fluid-filled elastic mount of this invention in the form of an engine mount for a motor vehicle.

Referring first to FIG. 1 showing an electrically controllable fluid-filled elastic engine mount for a motor vehicle, reference numerals 10 and 12 denote a first and a second support which are made of metals and are spaced apart from each other by a suitable distance in a load receiving direction in which the engine mount receives input vibrations. These two supports 10, 12 are elastically connected to each other by an elastic body 14 interposed therebetween. The engine mount is used to mount a power unit (including an engine) on the body of the vehicle, in a vibration damping fashion, such that the first and second supports 10, 12 are fixed to one and the other of the power unit and the vehicle body. For instance, the first support 10 is fixed to the power unit, by a fixing bolt secured to the first support 10.

The first support 10 consists of an upper member 16 and a lower member 18 which are generally hat-shaped and have respective outward flanges 20, 22. The upper member 16 has a cylindrical portion defining a cylindrical recess 23, and the outward flange 20 extends radially outwardly from the open end of the cylindrical portion. The lower member 18 has a frusto-conical portion defining a frusto-conical recess 25, and the outward flange 22 extends radially outwardly from the open end of the frusto-conical portion. The upper and lower members 16, 18 are butted together at the outward flanges 20, 22 such that the cylindrical and frusto-conical recesses 23, 25 cooperate to define an enclosed space. The two members 16, 18 are bolted together to form the first support 10.

Within the enclosed space 23, 25 of the first support 10, there is disposed a generally frusto-conical flexible diaphragm 24. This diaphragm 24 is fixed with its peripheral portion being gripped by and between the opposed surfaces of the outward flanges 20, 22 of the upper and lower members 16, 18. The enclosed space 23, 25 is divided by the flexible diaphragm 24 into two fluid-tight sections corresponding to the two recesses 23, 25.

On the other hand, the second support 12 is a generally annular member having a relatively large diameter. The second support 12 is spaced by the elastic body 14 from the lower member 18 of the first support 10, in the axial direction which is parallel to the load receiving direction. The end face of the annular second support 12 on the side of the first support 10 is chamfered or tapered, so that the chamfered face is substantially parallel to the tapered wall of the frusto-conical portion of the lower member 18 of the first support 10.

The elastic body 14 which elastically connects the first and second supports 10, 12 has a generally frusto-conical shape and a generally frusto-conical bore. In the process of vulcanization of a suitable rubber material, the elastic body 14 is formed such that it is bonded at its small end to the frusto-conical surface of the lower member 18 of the first support 10, and at its large end to the chamfered end face of the second support 12. Thus, there is prepared an intermediate product consisting of the second support 12, the lower member 18 of the first support 10, and the elastic body 14 formed therebetween.

In the intermediate product 12, 14, 18, the frusto-conical bore of the elastic body 14 is closed at its small end by the bottom wall of the lower member 18. Thus, there is formed a frusto-conical recess 26 which is open at its large end to the bore of the second support 12.

Within the bore of the second support 12 communicating with the frusto-conical recess 26, there is disposed an oscillating plate 27 in the form of a circular disk having a relative small thickness, such that the oscillating plate 27 is coaxial with the support 12 and is located at the open end of the recess 26. This oscillating plate 27 is elastically supported by the second support 12, through an annular elastic support 28, which is secured to the second support 12 through an annular retainer ring 30 bolted to the inner surface of the support 12. That is, the annular elastic support 28 is interposed between and secured to the oscillating plate 27 and the retainer ring 30, so that the plate 27 is displaceable in the axial direction relative to the support 12, due to elastic deformation of the elastic support 28.

With the oscillating plate 27 elastically fixed to the second support 12 by the elastic support 28, the frusto-conical recess 26 is fluid-tightly enclosed to form a fluid chamber in the form of a pressure-receiving chamber 32 filled with a suitable non-compressible fluid, preferably water, alkylene glycol, polyalkylene glycol and silicone oil.

Since the pressure-receiving chamber 32 is partially defined by the wall of the elastic body 14, the pressure of the fluid in the chamber 32 changes due to elastic deformation of the elastic body 14 upon application of a vibrational load between the first and second support 10, 12 in the load receiving direction, i.e., in the axial direction of the engine mount.

The pressure-receiving chamber 32 communicates, through an orifice passage 46, with an equilibrium chamber 34 also filled with the non-compressible fluid. Namely, the equilibrium chamber 34 is defined by the flexible diaphragm 24 and a disk 38 accommodated in the frusto-conical recess 25 of the lower member 18 of the first support 10. The disk 38 is bolted to the bottom wall of the lower member 18, which functions as partition means for separating the pressure-receiving and equilibrium chambers 32, 34. The disk 38 has a circumferential groove 40 in the surface which contacts the bottom wall of the lower member 18. The circumferential groove 40 communicates with the pressure-receiving chamber 32 through a communication hole 42 formed through the bottom wall of the lower member 18, and with the equilibrium chamber 34 through a communication hole 44 formed through the disk 38. Thus, the groove 40 cooperates with the communication holes 42, 44 to define the orifice passage 46 for fluid communication between the two fluid chambers 32, 34. It will be understood that the lower member 18 and the disk 38 function as means for defining the orifice passage 46.

The flexible diaphragm 24 elastically yields to permit each volumetric change of the equilibrium chamber 34 when the fluid flows into and from the equilibrium chamber 34 upon application of a vibrational load to the engine mount. Thus, the flexible diaphragm 24 absorbs a pressure change in the equilibrium chamber 34. The flexible diaphragm 24 and the upper member 16 of the first support 10 define an air chamber 36, which permits elastic deformation or displacement of the flexible diaphragm 24.

When a pressure change of the fluid occurs in the pressure-receiving chamber 32 due to the input vibration, the fluid is forced to flow through the orifice passage 46, between the two fluid chambers 32, 34, whereby the input vibration is damped based on the resonance of the fluid flowing through the orifice passage 46, as well known in the art. The orifice passage 46 is tuned, that is, the length and cross sectional area of the passage 46 are determined, so as to effectively damp low-frequency vibrations such as shake, based on the resonance of the fluid flowing through the orifice passage 46.

The engine mount is equipped with an electromagnetic drive device 48 for actuating the oscillating plate 27, which partially defines the pressure-receiving chamber 32. The drive device 48 is disposed on the side of the plate 27 remote from the pressure-receiving chamber 32.

The electromagnetic drive device 48 includes a permanent magnet 50 in the form of a solid cylinder having opposite magnetic poles or pole faces at its axially opposite ends. The permanent magnet 50 is accommodated in a ferromagnetic base men%her 54 which has a bottom wall portion 55a and a cylindrical wall portion 55b. More specifically, the magnet 50 is positioned in a cylindrical space 57 defined by the cylindrical and bottom wall portions 55a, 55b of the base member 54, such that the lower pole face of the magnet 50 is in contact with a radially central portion of the bottom wall portion 55a of the base member 54. The base member 54 has an outward flange 52 at the open end of the cylindrical wall portion 55b, and is attached at its outward flange 52 to the second support 12, by screws 76, such that the cylindrical space 57 is open toward the oscillating plate 27.

A ferromagnetic circular end disk 56 having a relatively large thickness is disposed in contact with the upper pole face of the permanent magnet 50. The end disk 56 has a diameter which is larger than that of the magnet 50 and smaller than the inside diameter of the cylindrical wall portion 55b of the base member 54. The end disk 56 is forced onto the pole face of the magnet 50, by fastening means in the form of a plurality of screws 58 which fixes the end disk 56 to the base member 54 such that the permanent magnet 50 is tightly gripped by and between the end disk 56 and the base member 54. The screws 58 are screwed into the peripheral portion of the end disk 56, which protrudes radially outwardly from the periphery of the pole face of the magnet 50.

At the open end of the cylindrical wall portion 55b of the ferromagnetic base member 54, there is disposed a ferromagnetic annular member 60 bolted to the outward flange 52. This annular member 60 includes a cylindrical portion whose outer circumferential surface is in contact with the inner circumferential surface of the cylindrical wall portion 55b of the base member 54. With the annular member 60 thus attached to the base member 54, there exists a given radial spacing between the inner circumferential surface of the cylindrical portion of the annular member 60 and the opposite outer circumferential surface of the end disk 56.

The base member 54, end disk 56 and annular member 60 are all made of an iron or other ferromagnetic material, so that there is formed a closed magnetic path or circuit. The end disk 56 and the annular member 56 which partially define the closed magnetic circuit cooperate to define an annular or cylindrical gap 62.

In the present embodiment, the base member 54 and annular member 60 function as a first yoke member connected to the lower pole face of the permanent magnet 50, while the end disk 56 functions as a second yoke member connected to the upper pole face of the magnet 50. These first and second yoke members cooperate with the magnet 50 to provide the closed magnetic circuit. The screws 58 connecting the base member 54 and the end disk 56 are made of a non-magnetic material such as an aluminum alloy, to prevent shorting of the magnetic circuit.

Figure 2:
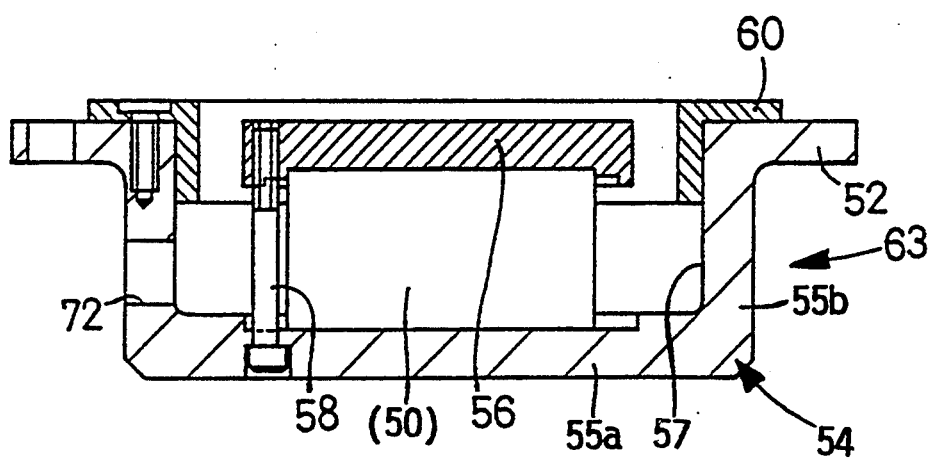
FIG. 2 is an elevational view in axial cross section of a magnet assembly prepared as an intermediate product prepared during manufacture of the elastic mount of FIG. 1, including a blank for permanent magnet and two yoke members which define a magnetic circuit.
Figure 3:
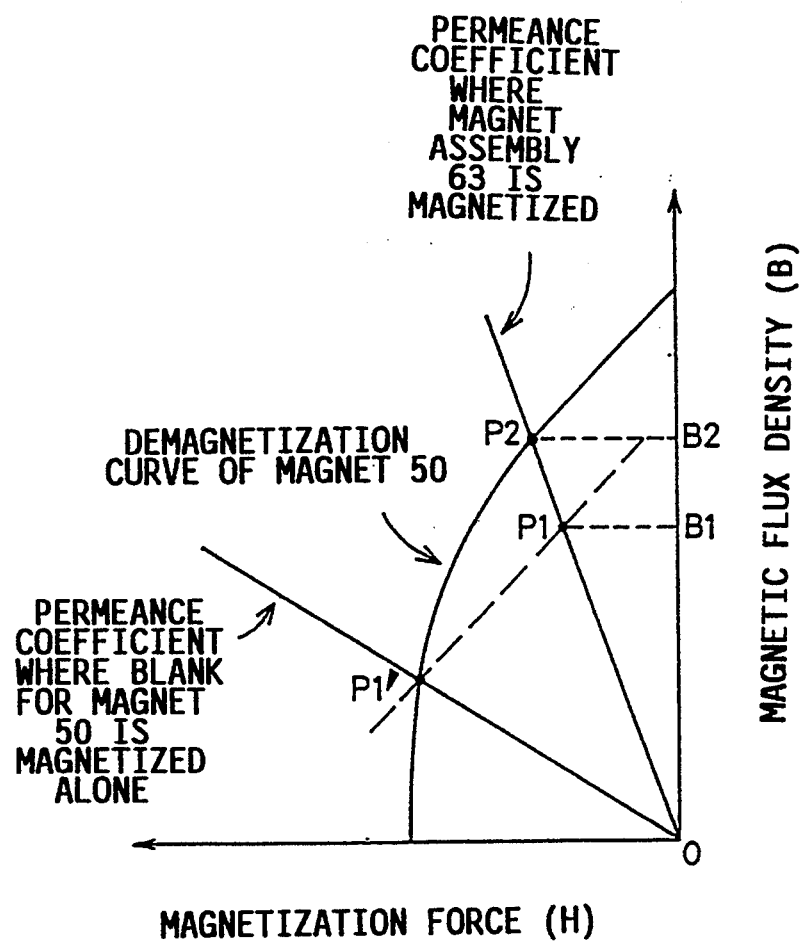
FIG. 3 is a graph indicating permeance coefficient of the magnetized magnet assembly, as compared with that of the permanent magnet which is magnetized alone.

The permanent magnet 50 is prepared by magnetizing an appropriate unmagnetized blank of a magnetic or ferromagnetic material such as iron or steel alloys or ferrite. This magnetizing operation is effected after the blank, base member, end disk 56 and annular member 60 are assembled together into an intermediate product in the form of a magnet assembly 63 as shown in FIG. 2. In other words, the blank for the magnet 50 is magnetized to obtain the permanent magnet 50, after the unmagnetized assembly 63 is prepared.

To magnetize the unmagnetized blank into the magnet 50, the unmagnetized magnet assembly 63 including the blank is exposed to a magnetic field, which is produced by applying an electric current to a coil placed around the assembly 63. In this magnetizing operation, the electric current is determined to provide a magnetic force which is several times the coercive force of the permanent magnet 50 to be prepared.

Figure 5:
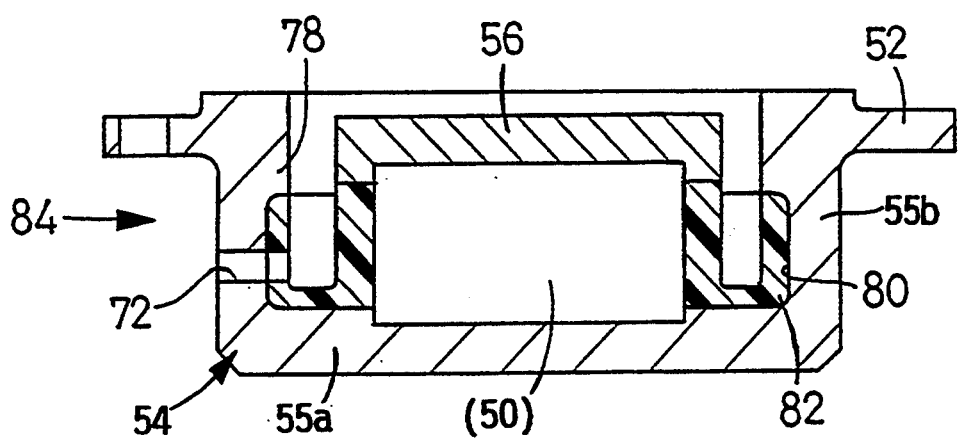
FIG. 5 is an elevational cross sectional view of a magnet assembly of the elastic mount of FIG. 5.

As a result of exposure to a magnetic field of the assembly 63 which includes the base member 54, end disk 56 and annular member 60 as well as the blank for the magnet 50, the magnet assembly 63 is provided with the closed magnetic circuit or path, and is given a permeance coefficient which is considerably greater than that of the permanent magnet 50 obtained by magnetizing only the blank for the magnet 50. Suppose the blank for the magnet 50 is made of a magnetic material whose demagnetization curve is shown in FIG. 5, the operating point of the magnet 50 obtained by magnetizing its blank alone is indicated at P1', and the operating point is shifted to P1 when the magnet 50 is assembled with the other components 54, 56, 60 of the magnet assembly 63. At point P1, the magnetic flux density is equal to B1, which is smaller than B2. Namely, the operating point of the magnet 50 obtained by magnetizing its blank together with the other components of the assembly 63 is shifted to P2 at which the magnetic flux density is equal to B2, which is considerably greater than the density B1.

Within the annular gap 62 between the end disk 56 and the annular member 60 of the magnet assembly 63 thus prepared, there is disposed an annular moving coil 68 which is axially movable within the annular gap 62. The moving coil 68 is supported by a cylindrical movable member 64 made of a non-magnetic material such as a synthetic resin or aluminum alloy. The movable member 64 has a cylindrical portion 66 extending through the annular gap 62.

The annular moving coil 68 is secured to the outer circumferential surface of the cylindrical portion 66 of the movable member 64, so that the movable member 64 is moved with the coil 68 when the coil 68 is moved with an electric current applied thereto as described below, through conductor wire 70 extending through hole 72 formed through the base member 54. To permit axial movements of the cylindrical portion 66 and the coil 68, small radial clearances are provided between the end disk 56 and the cylindrical portion 66, and between the coil 68 and the annular member 60.

The axial length of the annular coil 68 is selected to be smaller than the axial length of the cylindrical portion of the annular member 60, so that the coil 68 axially displaced within the gap 62 is always positioned within the axial length of the annular member 60, in order to assure a substantially constant magnetic flux density applied to the coil 68, irrespective of the axial position of the coil 68.

The electromagnetic drive device 48 obtained by attaching the movable member 64 and annular coil 68 to the magnet assembly 63 is attached, at the outward flange 52 of the base member 54, to the lower end of the second support 12 by means of the screws 76. At the same time, the base wall of the movable member 64 is secured to the underside of the oscillating plate 27 by a bolt 74. In this condition, the annular moving coil 68 is located at an axially middle portion of the annular gap 62.

In operation of the engine mount constructed as described above, the moving coil 68 is energized by a controlled alternating current, whereby the coil 68 is subject to an electromagnetic force (Lorentz force) produced according to the Fleming's left-hand rule, so that the coil 68 is moved with the movable member 64. As a result, the oscillating plate 27 is displaced with a force proportional to the amount of electric current applied to the coil 68. The oscillating plate 27 is oscillated by controlling the current applied to the coil 68, depending upon the pressure change in the pressure-receiving chamber 32 due to the input vibrational load. Thus, the fluid pressure in the chamber 32 can be effectively regulated so as to change the damping characteristic of the engine mount, depending upon the type of vibration received.

Described in detail, when the frequency of the input vibration is relatively low, the oscillating plate 27 is oscillated in the same phase as the input vibration, so as to positively cause a fluid pressure change in the pressure-receiving chamber 32, for increasing the amount of the fluid which flows through the orifice passage 46, and thereby improving the damping effect based on the fluid flow through the orifice passage 46. When the frequency of the input vibration is in a medium or low band, the phase of oscillation of the oscillating plate 27 is reversed with respect to that of the input vibration, to thereby absorb the fluid pressure change in the chamber 32 or reduce the amount of the fluid pressure change, so that the engine mount exhibits an effectively reduced dynamic spring constant with respect to the medium to low frequency vibration.

In the electromagnetic drive device 48 of the present engine mount, the magnetic field to which the moving coil 68 is exposed has a sufficiently high magnetic flux density, with a reduced amount of magnetic flux leakage from the permanent magnet 50, since the magnetic field is produced at the annular gap 62 provided in the closed magnetic circuit or path. Consequently, upon energization of the moving coil 68, a sufficiently large magnetic force is produced to actuate the oscillating plate 27 so as to suitably regulate the fluid pressure in the pressure-receiving chamber 32, and thereby exhibit optimum damping characteristics depending upon the type of the input vibration, without increasing the complexity and size of the electromagnetic drive device 48. The sufficiently high magnetic flux density at the annular gap 62 permits the use of the magnet 50 whose magnetic force is relatively small, namely, the magnet 50 which is relatively economical to manufacture.

Further, the permanent magnet 50 assures a comparatively large magnetic force, and the magnetic flux density at the annular gap 62 is held sufficiently high, because the magnet assembly 63 including not only the blank for the magnet 50 but also the other components 54, 56, 60 which define the magnetic circuit is magnetized as a whole. This manner of preparing the magnet 50 (magnet assembly 63) cooperates with the reduced amount of magnetic flux leakage indicated above, to assure improved stability in actuating the oscillating plate 27 to suitably regulate the fluid pressure in the chamber 32, and accordingly enhanced damping characteristics of the present engine mount.

As the magnetic field in which the moving coil 68 is placed is produced at the annular gap 62 in the closed magnetic circuit or path defined by the components 50, 54, 60, 56, the magnetic flux density in the magnetic field and the magnetic force produced are made uniform throughout the field, irrespective of the axial position of the coil 68 which is axially moved within the gap 62. This arrangement permits the produced magnetic force to be substantially proportional to the amount of electric current to be applied to the moving coil 68, whereby the oscillation of the oscillating plate 27 can be comparatively easily controlled, with an effectively reduced amount of distortion of waveform of the fluid pressure pulsation in the pressure-receiving chamber 32. Thus, the present engine mount is capable of intricately and precisely controlling the fluid pressure within the chamber 32, so as to exhibit improved damping stability with respect to the input vibrations over a wide range of frequency. Accordingly, the present engine mount is substantially free from the conventionally experienced problem that the distortion of the pulsation waveform results in amplifying the vibration whose frequency is outside the frequency band of the vibrations which can be effectively damped by the aid of the oscillating plate 27.

An experiment was conducted on the engine mount constructed as described above. The specimen engine mount, which has a static spring constant Ks of 24.0(kg/mm), is subjected to three different vibrations whose frequency (Hz) and amplitude are indicated in the table. The dynamic spring constant K*(kg/mm) and phase angle δ(deg) of the mount were measured in a first test condition in which the oscillating plate 27 was not operated, and in a second test condition in which the oscillating plate 27 was operated. The effect of the oscillating plate 27 was evaluated with respect to the different vibrations, in terms of the reduction ratio of the dynamic spring constant in the second test condition to that in the first test condition. A result of the experiment is indicated in TABLE 1 below.

TABLE 1

| Input Vibrations | 25 Hz ± 0.2 mm | | 100 Hz ± 0.05 mm | | 200 Hz ± 0.03 mm | |
|---|---|---|---|---|---|---|
| Characteristics | K* (kg/mm) | δ (deg) | K* (kg/mm) | δ (deg) | K* (kg/mm) | δ (deg) |
| First Test | 37.25 | 8.0 | 45.0 | 66.0 | 51.7 | −53.3 |
| Second Test | 23.25 | 3.3 | 3.5 | 30.0 | (<1.0) | — |
| Reduction Ratio | −38% | — | −92% | — | −100% | — |
| Coil Energizing Power | 35W | | 35W | | 38W | |

It will be understood from TABLE 1 that the present engine mount having the oscillating plate 27 actuated by the electromagnetic drive device 48 exhibited excellent damping effects with respect to input vibrations over a wide range of frequency, from engine idling vibration to booming noise and secondary engine vibration of the vehicle.

According to the method of manufacturing the engine mount as described above, the base member 54, end disk 56 and annular member 60 which define the closed magnetic circuit are assembled with respect to the unmagnetized blank for the magnet 50, to prepare the unmagnetized magnet assembly 63. Therefore, the assembling operation can be easily effected. If the prepared permanent magnet 50 was assembled with the other components to prepare the magnet assembly 63, the assembling procedure would be disturbed by a strong magnetism of the magnet 50.

As described above, the electromagnetic drive device 48 including the magnet assembly 63 is prepared separately from the main assembly which includes the supports 10, 12, elastic body 14 and oscillating plate 27. Accordingly, the magnetizing operation on the unmagnetized magnet assembly 63 can be readily conducted, before the drive device 48 is attached to the main assembly.

Figure 4:
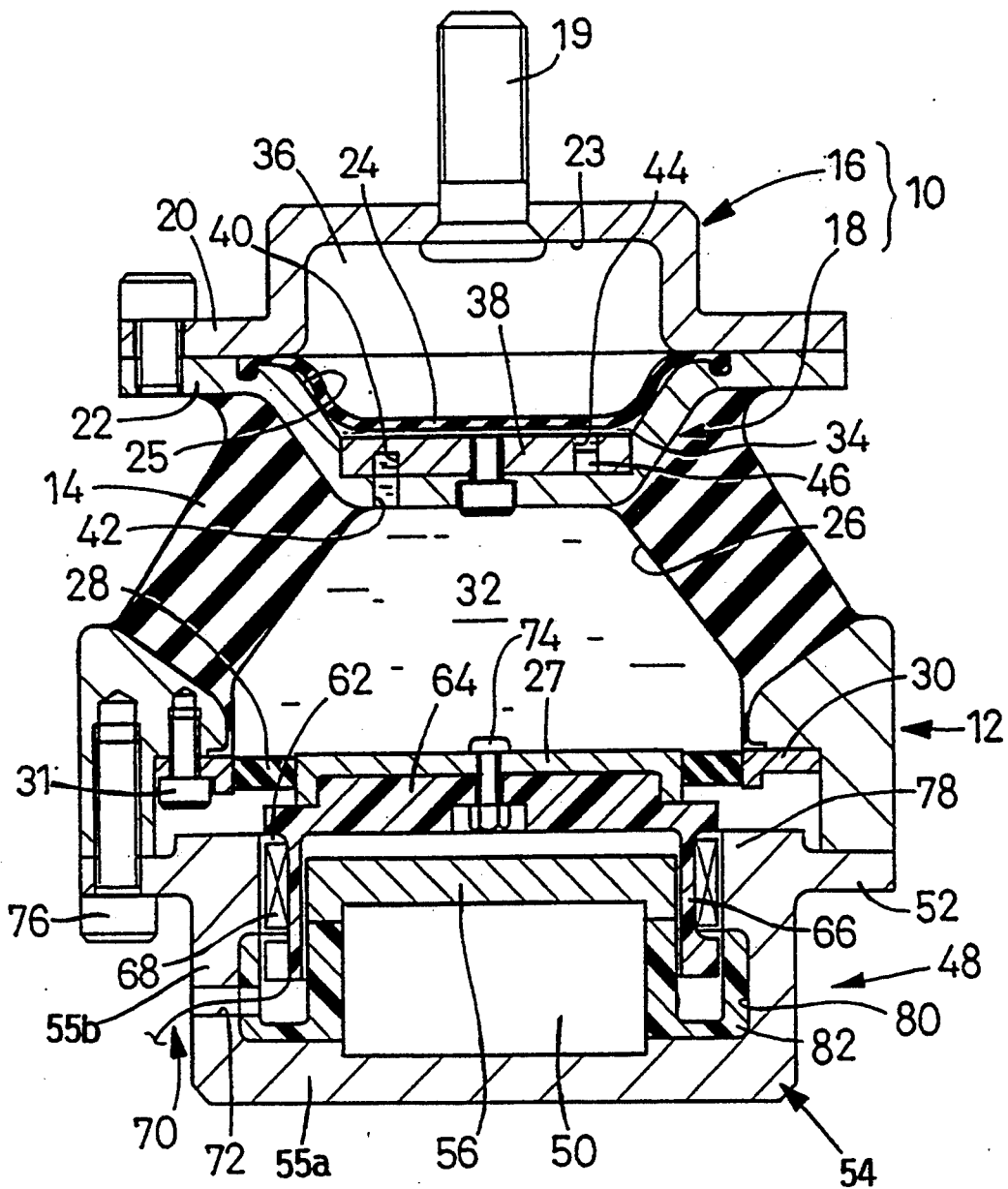
FIG. 4 is an elevational cross sectional view showing a second embodiment of the elastic mount of this invention.

Referring next to FIGS. 4 and 5, there will be described another embodiment of this invention also in the form of a vehicle engine mount, which is modified in the electromagnetic drive device 48, with respect to the first embodiment of FIGS. 1 and 2. In the interest of brevity and simplification, the same reference numerals as used in the first embodiment will be used in the second embodiment to identify the corresponding components, and redundant description of these components will not be provided.

The second embodiment uses a magnet assembly 84 as shown in FIG. 5. As in the first embodiment, the cylindrical permanent magnet 50 of the assembly 84 is accommodated in the base member 54 such that the lower magnetic pole face is in contact with the bottom wall portion 55a of the base member 54. The end disk 56 is in contact with the other pole face of the magnet 50, as in the first embodiment.

However, the magnet assembly 84 does not include the annular member 60 used in the first embodiment. Instead, the base member 54 includes an annular protrusion 78 which protrudes radially inwardly toward the periphery of the end disk 56. This annular protrusion 78 cooperates with the outer circumferential surface of the end disk 56 to define the annular gap 62. In the present second embodiment, the magnet 50, base member 54 and end disk 56 cooperate to define a closed magnetic circuit or path. In the presence of the annular protrusion 78, the base member 54 is given an annular recess 80.

The base member 54, magnet 50 and end disk 56 which define the magnetic circuit are bonded together by bonding means in the form of a mass of resin material 82, so as to provide the magnet assembly 84 in which the base member 54 and the end disk 56 are in contact with the respective magnetic pole faces at the opposite axial ends of the magnet 50.

As in the first embodiment, the magnet 50 is prepared by magnetizing the blank for the magnet after the base member 54, blank for the magnet 50 and the end disk 56 are bonded together. Namely, the mass of resin material 82 is injected into the interior of the base member 54 after the blank for the magnet 50 with the end disk 56 resting on its top face is positioned in the base member 54. As shown in FIG. 5, the mass of resin material 82 fills also the annular recess 80, to prevent the removal of the mass 82.

In the present second embodiment, too, the blank for the magnet 50 incorporated in the magnet assembly 84 (in the unmagnetized state) is magnetized into the magnet 50, together with the other components 54, 56 of the assembly 84. Accordingly, the second embodiment has the same advantages as the first embodiment. In addition, the second embodiment which uses the bonding resin mass 82 in place of the fixing bolts 58 does not suffer from partial disconnection of the magnetic circuit and magnetic leakage due to the use of the bolts 58 and the holes for the bolts 58. In this respect, the resin mass 82 has extremely low magnetic permeability. Thus, the present embodiment assures sufficiently high magnetic flux density at the annular gap 62, and an increased electromagnetic force produced upon energization of the moving coil 68, whereby the oscillating plate 27 can be oscillated with high stability.

The use of the resin mass 82 used for bonding of the magnet 50, base member 54 and end disk 56 protects the magnet 50 against oxidation due to exposure to the ambient atmosphere, even when the magnet 50 is made of a rare earth which has excellent magnetic properties.

Figure 6:
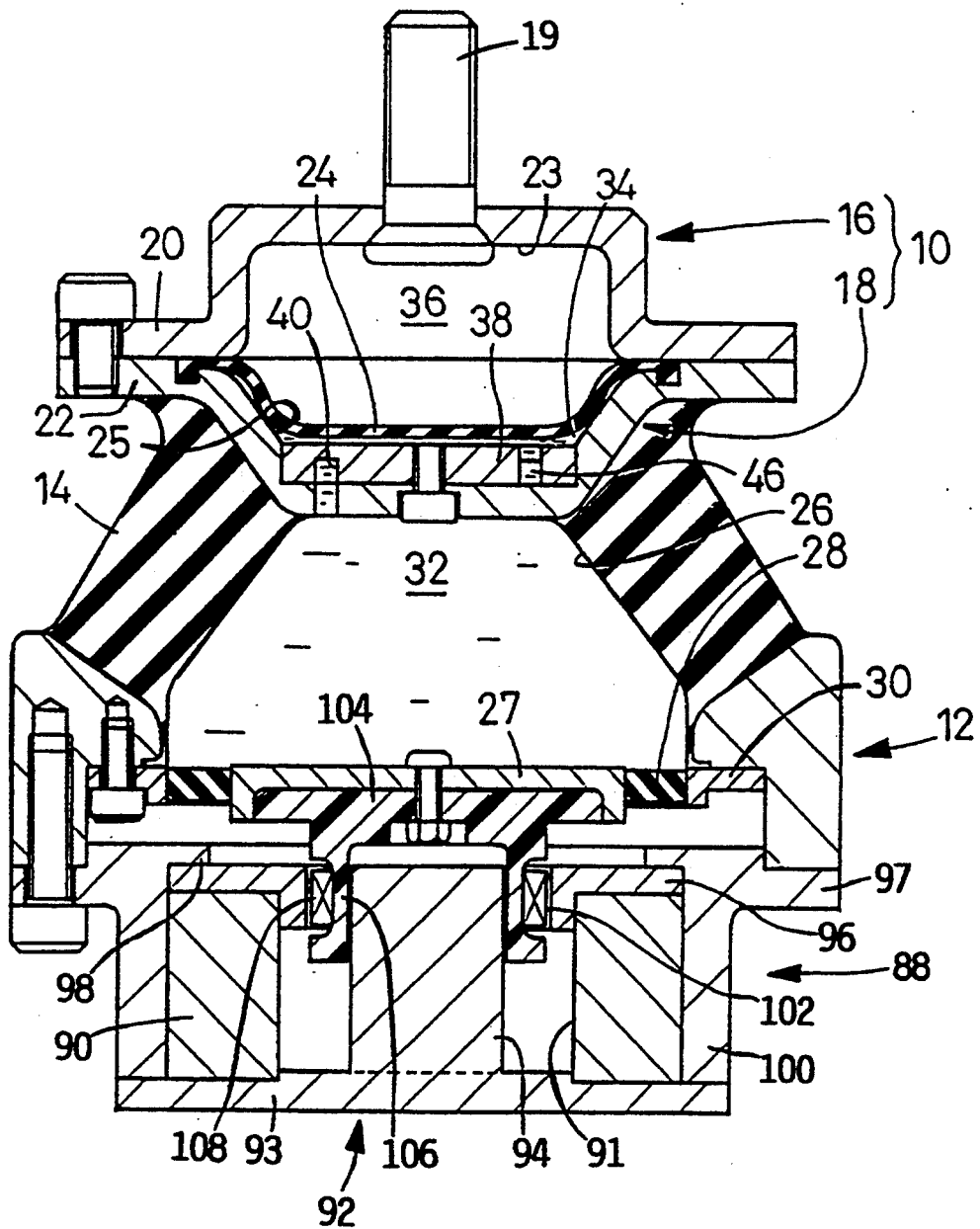
FIG. 6 is an elevational cross sectional view showing a third embodiment of the elastic mount of the invention.

Referring to FIG. 6, there will be described a third embodiment of this invention, which uses an electromagnetic drive device 88 in place of the device 48 used in the first and second embodiments.

The electromagnetic drive device 88 includes an annular permanent magnet 90 having annular magnetic pole faces at its opposite axial ends. The drive device 88 further includes a first yoke member 92 which consists of a base plate portion 93 in the form of a circular disk, and a central cylinder portion 94 which extends from a central portion of the base plate portion 93. The permanent magnet 90 is positioned on the base plate portion 93 such that the lower magnetic pole face of the magnet 90 is in contact with the radially outer portion of the base plate portion 93. The central cylinder portion 94 extends through a center bore 91 of the annular magnet 90, and is located radially inwardly of the annulus of the magnet 90.

A generally annular second yoke member 96 is placed in contact with the other or upper magnetic pole face of the magnet 90. This second yoke member 96 has an inside diameter smaller than that of the magnet 90 and larger than an outside diameter of the cylinder portion 94 of the first yoke member 92. That is, the second yoke member 96 has an radially inner protrusion in contact with the upper end portion of the inner circumferential surface of the annular magnet 90. This radially inner protrusion of the second yoke member 96 is spaced from the outer circumferential surface of the cylinder portion 94 by a suitable distance in the radial direction of the magnet 90.

The first and second yoke members 92, 96 are made of an iron or other suitable ferromagnetic material. These yoke members 92, 96 cooperate with the magnet 90 to define a closed magnetic circuit or path. The inner circumferential surface of the second yoke member 96 and the upper end portion of the outer circumferential surface of the cylinder portion 94 define an annular gap 102 on the magnetic circuit.

A cylindrical mounting bracket 100 is secured at an outward flange 97 to the lower end of the outer sleeve 12, such that an assembly of the magnet 90, base plate portion 93 of the first yoke member 92 and second yoke member 96 is fitted in the mounting bracket 100, in contact with the inner circumferential surface of the bracket 100. The bracket 100 has an annular protrusion 98 at its upper end, which extends radially inward for abutting contact with the outer peripheral portion of the annular second yoke member 96. The magnet 90 and the second yoke member 96 are forced by this annular protrusion 98 against the upper surface of the base plate portion 93 of the first yoke member 92. Thus, the magnet 90 and the first and second yoke members 92, 96 are fixed together. The mounting bracket 100 is made of aluminum or other non-magnetic material, to avoid shorting of the magnetic circuit.

Within the annular gap 102 between the second yoke member 96 and the cylinder portion 96 of the first yoke member 92, there is disposed an annular moving coil 108 which is axially movable within the annular gap 102. The moving coil 108 is supported by a cylindrical movable member 104 made of a non-magnetic material such as a synthetic resin or aluminum alloy. The movable member 104 has a cylindrical portion 106 extending through the annular gap 102. As in the preceding embodiments, the annular moving coil 108 is secured to the outer circumferential surface of the cylindrical portion 106 of the movable member 104, so that the movable member 104 is moved with the coil 108 when the coil 108 is moved with an electric current applied thereto. The axial length of the annular coil 108 is smaller than the axial length of the inner protrusion of the second yoke member 96, so that the coil 108 axially displaced within the gap 102 is always positioned within the axial length of the annular gap 102.

The electromagnetic drive device 108 is attached at the outward flange 97 to the lower end of the second support 12, such that the annular moving coil 108 is located at an axially middle portion of the annular gap 102. The drive device 108 thus constructed has the same advantages as the drive device 48 used in the preceding embodiments, namely, sufficiently high and uniform magnetic flux density at the annular gap 102, and a reduced amount of magnetic flux leakage from the permanent magnet 90, due to the closed magnetic gap 102 which is defined by the magnet 90, and the first and second yoke members 92, 96 connected to the opposite magnetic poles of the magnet 90.

Further, the use of the annular permanent magnet 90 disposed in the radially outer portion of the drive device 88 assures a comparatively large transverse cross sectional area, for a given diameter of the drive device 88 (elastic mount). The annular magnet 90 therefore assures a comparatively large magnetic force, and an accordingly high magnetic flux density at the annular gap 102.

Since the magnetic circuit is formed radially inwardly of the annular magnet 90, the magnetic flux is formed in a radially inner portion of the drive device 88, whereby the magnetic flux density at the annular gap 102 is further increased.

Figure 7:
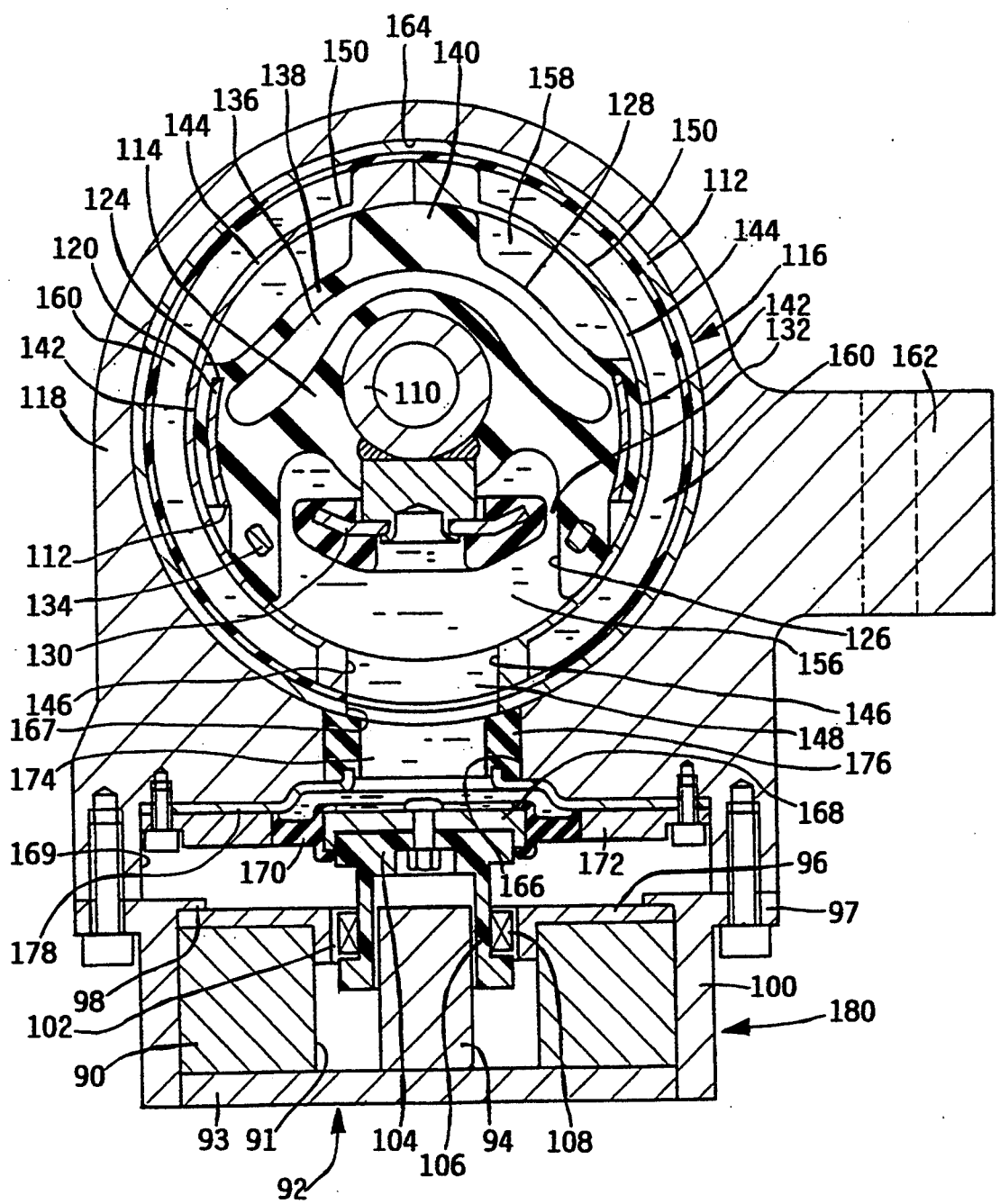
FIGS. 7 and 8 are elevational views in transverse and axial cross sections, respectively, of a fluid-filled elastic mount according to a fourth embodiment of the invention.
Figure 8:
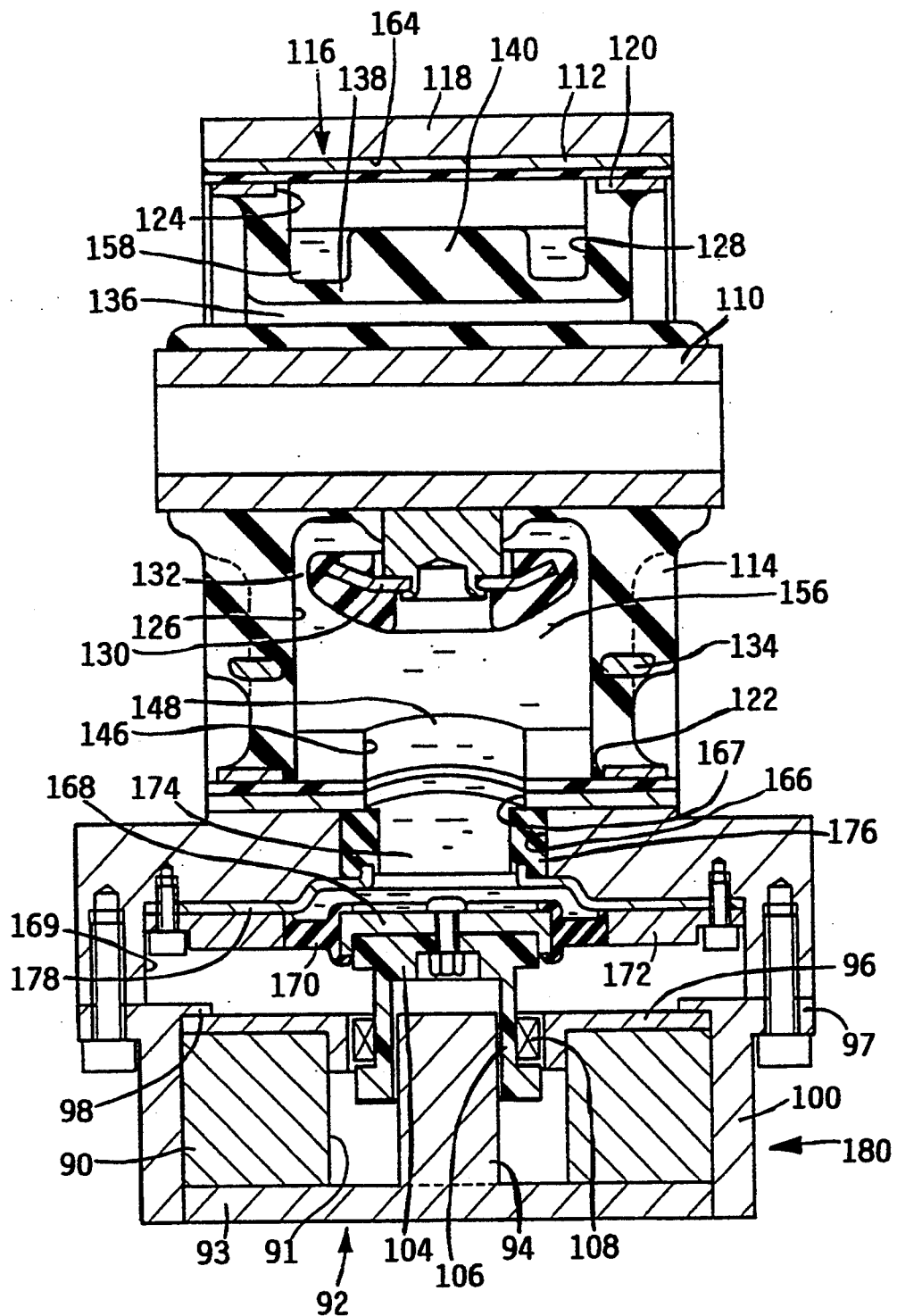

Referring next to FIGS. 7 and 8, there will be described a fourth embodiment of the present invention in the form of a fluid-filled engine mount for a front-engine front-drive vehicle. The engine mount according to this embodiment consists of a mount body 116, a mounting bracket 118, and an electromagnetic drive device 180. The mount body 116 is different from that of the engine mounts of FIGS. 1, 4 and 6, and the electromagnetic drive device 180 is substantially identical with the drive device 88 of FIG. 6.

The mount body 116 includes a first and a second support in the form of an inner sleeve 110, and an outer sleeve 112 disposed radially outwardly of the inner sleeve 110 such that the two sleeves 110, 112 are eccentric with each other. These two sleeves 110, 112 are made of a metallic material, and are elastically connected to each other by an elastic body 114 interposed therebetween. The mount body 116 is received in the mounting bracket 118. One of the inner and outer sleeves 110, 112 is fixed to one of the vehicle body, while the other sleeve 110, 112 is fixed to a power unit of the vehicle. For instance, the inner sleeve 110 is fixed to the power unit, while the outer sleeve 112 is fixed to the vehicle body through the mounting bracket 118. With the weight of the power unit acting on the inner sleeve 110 as a static load, the elastic body 114 is elastically deformed, and the inner and outer sleeves 110, 112 are radially displaced relative to each other, whereby the two sleeves 110, 112 are made substantially concentric with each other. In operation of the engine mount installed on the vehicle as described above, a dynamic vibrational load is applied to the engine mount in a diametric direction (load receiving direction) in which the inner and outer sleeves 110, 112 are initially offset from each other, i.e., in the vertical direction as seen in FIG. 7.

The inner sleeve 110 has a relatively large cylindrical wall thickness, and an intermediate sleeve 120 is disposed radially outwardly of the inner sleeve 110. The intermediate sleeve 120 is also made of a metallic material, and is eccentric with respect to the inner sleeve 110. The elastic body 114 is a generally cylindrical member connecting the inner and intermediate sleeves 110, 120. The elastic body 114 and the inner and intermediate sleeves 110, 120 constitute an integral inner assembly prepared by vulcanizing an appropriate rubber material for the elastic body 114.

The intermediate sleeve 120 has a first window 122 and a second window 124 which are diametrically opposed to each other with the inner sleeve 110 interposed therebetween in the load receiving direction. The elastic body 114 has a first and a second recess 126, 128 open on its outer circumferential surface through the respective windows 122, 124. In the first recess 126, there is disposed a wing member 130 such that the wing member 130 substantially divides the recess 126 into two sections, which are located in respective radially inner and portion of the elastic body 114. The wing member 130 cooperates with the inner surface of the elastic body 114 defining the first recess 126, to define an annular resonance portion or restricted fluid passage 132 for fluid communication between the above-indicated two sections of the first recess 126. To prevent irregular deformation of a portion of the elastic body 114 which defines the first recess 126, that portion has an annular restricting metal member 134 embedded therein.

The elastic body 114 has an axial void 136 formed therethrough so as to extend over the entire axial length, as shown in FIG. 8. The axial void 136 is located between the inner sleeve 110 and the second recess 128. In the presence of this axial void 136, the elastic wall defining the bottom of the second recess 128 is thin-walled as indicated at 138 in FIG. 7. The thin elastic wall 138, which is easily elastically deformable or displaceable, is formed with a central thick-walled portion which functions as a stopper 140 for limiting an amount of relative radial displacement of the inner and outer sleeves 110, 112, to thereby prevent excessive deformation of the elastic body 114.

The above-indicated inner assembly 110, 114, 120 of the mount body 116 has two part-circumferential grooves 142, 142 formed in the outer circumferential surface, such that these grooves 142 connect the first and second recesses 126, 128. In these grooves 142, two orifice-defining members 144, 144 are received, respectively. Each of the orifice-defining members 144 has a semi-circular cross sectional shape, so that the two orifice-defining members 144 received in the appropriate part-circumferential grooves 142 constitute a cylindrical member. Each orifice-defining member 144 has a semi-circular cutout 146 at one of its opposite circumferential ends, at which the two orifice-defining members 144 are butted together. The cutouts 146 of the two orifice-defining members 144 cooperate to define a circular hole 148 which communicates with the first recess 126, as indicated in FIG. 7.

Figure 9:
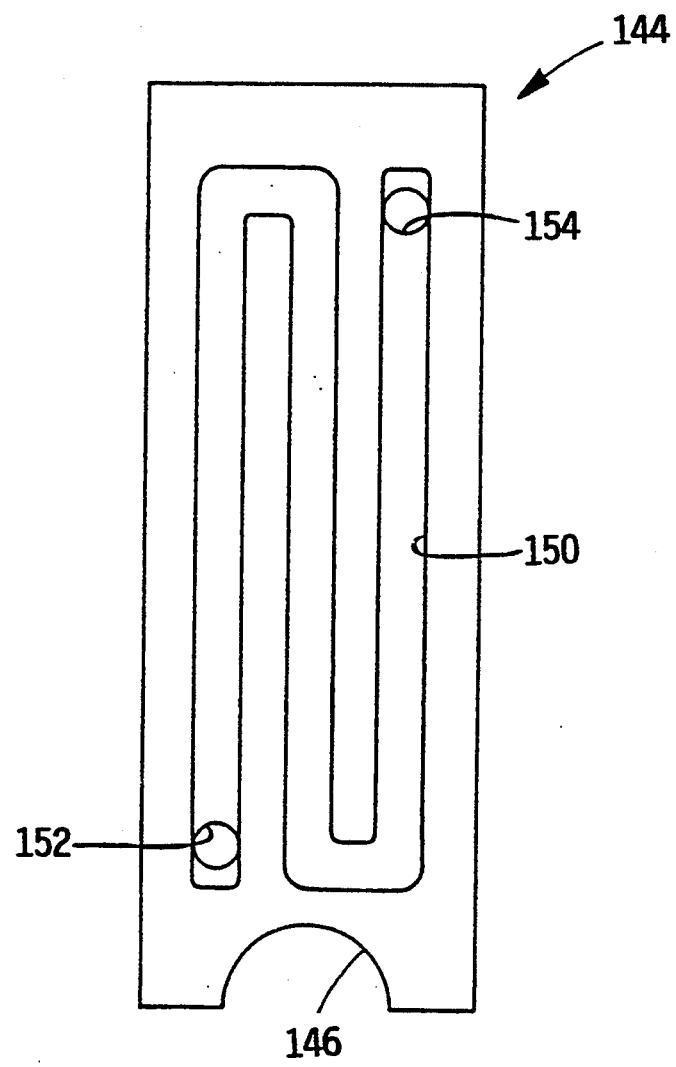
FIG. 9 is a plan view of an orifice-defining member used in the elastic mount of FIGS. 7 and 8.
Figure 10:
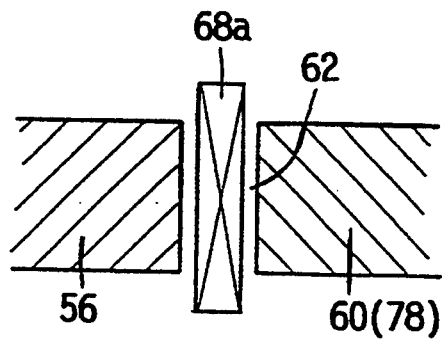
FIGS. 10–13 are fragmentary schematic views in cross section showing modifications of the above embodiments of the invention, in terms of the size of an annular moving coil relative to an annular gap in an electromagnetic drive device for the elastic mount.
Figure 11:
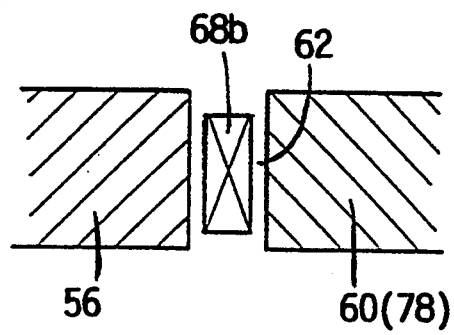
Figure 12:
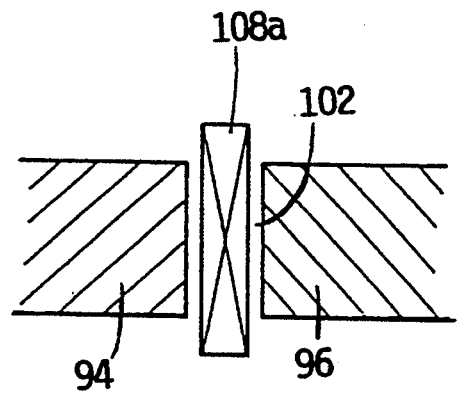
Figure 13:
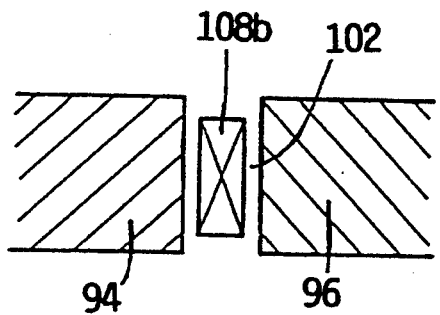

As shown in FIG. 9, each orifice-defining member 144 has a groove 150 which is U-shaped in cross section. The groove 150 has opposite ends adjacent to the opposite ends of the member 144, and is turned 180° near the opposite ends of the member 144, so that the groove 150 has a relatively large length. The member 144 has two communication holes 152, 154 formed through the thickness thereof, for communication with the respective opposite ends of the groove 150 and the respective first and second recesses 126, 128.

The outer sleeve 112 is mounted on the inner assembly 110, 114, 120 with the orifice-defining members 144 received in the grooves 142, such that the outer sleeve 112 is fitted on the outer circumferential surface of the intermediate sleeve 120. As a result, the first and second recesses 126, 128, and the groove 150 are closed by the outer sleeve 112, whose inner circumferential surface is provided with a sealing rubber layer. Thus, the mount body 116 has a pressure-receiving chamber 156 and an equilibrium chamber 158 which correspond to the first and second recesses 126, 128, respectively. These chambers 156, 158 are filled with a non-compressible fluid such as water, alkylene glycol, polyalkylene glycol or silicone oil. Further, the groove 150 cooperates with the communication holes 152, 154 to define an orifice passage 160 for fluid communication between the pressure-receiving chamber 156 and the equilibrium chamber 158.

Upon application of a vibrational load between the inner and outer sleeves 110, 112 in the load receiving direction, the pressure of the fluid within the pressure-receiving chamber 156 changes due to elastic deformation of the elastic body 114. On the other hand, a fluid pressure change in the equilibrium chamber 158 is substantially absorbed by elastic deformation or displacement of the thin-elastic wall 138, which causes a change in the volume of the equilibrium chamber 158. Accordingly, there arises a difference between the fluid pressures in the two fluid chambers 156, 158, whereby the fluid is forced to flow between the two chambers 156, 158 through the orifice passage 160. As well known in the art, the vibration applied is damped based on the resonance of the fluid flowing through the orifice passage. That is, the length and cross sectional area of the orifice passage 160 are tuned or determined so as to enable the present engine mount to exhibit an intended damping effect with respect to low-frequency vibrations such as shake having a relatively large amplitude, based on the resonance of the fluid flowing through the orifice passage 160.

The mount body 116 constructed as described above is held in the mounting bracket 118. More specifically, the bracket 118 has a cylindrical portion with a bore 164 in which the mount body 116 is press-fitted. The bracket 118 further has a mounting portion 162 radially outwardly extending from the cylindrical portion, so that the mount body 116 is secured at the mounting portion 162 to the vehicle body or vehicle power unit.

The outer sleeve 112 has a through-hole 167 which communicates with the pressure-receiving chamber 156 through the circular hole 148 of the orifice-defining members 144. On the other hand, the mounting bracket 118 has an aperture 166 which communicates with the pressure-receiving chamber 156 through the through-hole 167 and the circular hole 148.

The mounting bracket 118 has a circular recess 169 open at its lower end as seen in FIGS. 7 and 8. The circular recess 169 communicates with the aperture 166 and has a diameter considerably larger than that of the aperture 166. Within this circular recess 169, there is disposed an oscillating plate 168 similar to the oscillating plate 27 provided in the preceding embodiments. The oscillating plate 168 is fixed to an annular retainer ring 172 through an annular elastic support 170. That is, the oscillating plate 168 is bonded at its circumference to the elastic support 170, which in turn is supported by the retainer ring 172 bolted to the bracket 118. The elasticity of the elastic support 170 permits the oscillating plate 168 to be easily displaceable in its axial direction.

The annular elastic support 170 and oscillating plate 168 fluid-tightly close the aperture 166, whereby an auxiliary fluid chamber 174 is formed in communication with the pressure-receiving chamber 156. The auxiliary fluid chamber 174 and the pressure-receiving chamber 156 constitute a fluid chamber which communicates with the equilibrium chamber 158 through the orifice passage 160 and which is partially defined by the oscillating plate 168.

To secure fluid tightness between the pressure-receiving chamber 156 and the auxiliary fluid chamber 174, a sealing rubber sleeve 176 is disposed within the aperture 166. The rubber sleeve 176 is axially forced against the outer circumferential surface of the outer sleeve 112, by a pressure plate 178 bolted to the bracket 118.

The oscillating plate 168 is connected to the movable member 104 moved by the annular coil 108 of the electromagnetic drive device 180, as described above with respect to the third embodiment of FIG. 6.

It will be understood that the electromagnetic drive device 180 similar to the drive device 88 is applicable to the engine mount (mount body 116) which has the auxiliary fluid chamber 174 communicating with the pressure-receiving chamber 156.

While the present invention has been described in detail with its presently preferred embodiments with certain degrees of particularity, it is to be understood that the invention is not limited to the details of the illustrated embodiments, but may be otherwise embodied.

In the illustrated embodiments, the electromagnetic drive device 48, 88, 180 is applied to the engine mounts having the equilibrium chamber 34, 158 which communicates with the pressure-receiving chamber 32, 156 (and auxiliary fluid chamber 174) through the orifice passage 46, 160. However, the present invention is applicable to a fluid-filled elastic mount which does not have such equilibrium chamber and orifice passage and which damps input vibrations by suitably regulating the fluid pressure in the pressure-receiving chamber 32, 156 by the oscillating plate 27, 168. That is, the electromagnetic drive device 48, 88, 180 is also effective to control the oscillating plate 27, 168.

The yoke members which cooperate with the permanent magnet 50, 90 to define a closed gap (62, 102) are not limited to the members 54, 56, 60, 92, 96 used in the illustrated embodiments, but may be suitably modified, in size and configuration, for example, provided an annular gap accommodating an annular coil is formed behind the oscillating plate 27, 168.

Further, the axial length of the annular coil 68, 108 relative to the corresponding dimension of the members 56, 60, 78, 94, 96 defining the annular gap may be suitably selected. For instance, the coils 68 and 108 may be replaced by coils 68a, 68b, 108a, 108b as shown in FIGS. 10–13, to assure substantially uniform magnetic flux density at the annular gap 62, 102, irrespective of the axial position of the coils. The coils 68a and 108a of FIGS. 10 and 12 have an axial length considerably larger that the axial dimension of the gap 62, 102. The coils 68b and 108b of FIGS. 11 and 23 have an axial length sufficiently smaller than the axial dimension of the gap 62, 102.

In the illustrated embodiments, the blank for the permanent magnet 50, 90 is magnetized after the blank and the yoke members are assembled together into the magnet assembly (63, 84). However, the operation to magnetize the blank for the magnet to obtain the magnet can be effected after the electromagnetic drive device 48, 88, 180 is attached to the mount body (to the second support 12 or bracket 118).

Although the members which define the magnetic circuit or path are all members of the magnet assembly prepared separately from the mount body, a part of the second support 12 or mounting bracket 118 may be utilized to partially define the magnetic circuit.

While the illustrated fluid-filled elastic mounts are all engine mounts for a motor vehicle, the principle of the present invention is equally applicable to other types of vehicle damping devices such as vehicle body mounts and differential mounts, and even to vibration dampers or elastic mounts used in various equipment or systems other than those for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
   a first and a second support which are spaced apart from each other;
   an elastic body which is interposed between said first and second supports for elastically connecting the first and second supports and which partially defines a fluid chamber filled with a non-compressible fluid;
   an oscillating plate which partially defines said fluid chamber and which is displaceable to change a pressure of said fluid in said fluid chamber;
   a permanent magnet disposed on one of opposite sides of said oscillating plate remote from said fluid chamber;
   a first and a second yoke member which are connected to respective opposite magnetic pole faces of said permanent magnet and which cooperate with said permanent magnet to define a closed magnetic circuit, said first and second yoke members defining therebetween an annular gap in said magnetic circuit;
   an annular moving coil received in said annular gap and fixed to said oscillating plate, said moving coil being displaced in said annular gap in an axial direction thereof, to oscillate said oscillating plate upon energization of said moving coil.

2. A fluid-filled elastic mount according to claim 1, wherein said permanent magnet consists of a solid cylinder, and said annular gap is formed radially outwardly of said solid cylinder.

3. A fluid-filled elastic mount according to claim 2, wherein said first yoke member comprises a base member including a bottom wall portion and a cylindrical wall portion which cooperate to define a cylindrical space, said second yoke member comprising a circular disk disposed radially inwardly of said cylindrical wall portion, said solid cylinder being disposed within said cylindrical space such that one of opposite axial ends of said solid cylinder of said permanent magnet is in contact with said bottom wall portion of said base member while the other of said opposite axial ends is in contact with said circular disk.

4. A fluid-filled elastic mount according to claim 3, wherein said first yoke member further comprises an annular member fixed to said cylindrical wall portion of said base member, said annular member having an inner circumferential surface which cooperates with an outer circumferential surface of said circular disk to define therebetween said annular gap.

5. A fluid-filled elastic mount according to claim 3, wherein said cylindrical wall portion of said base member has an annular protrusion extending radially inwardly from one of opposite axial ends thereof remote from said bottom wall portion, said annular protrusion having an inner circumferential surface which cooperates with an outer circumferential surface of said circular disk to define therebetween said annular gap.

6. A fluid-filled elastic mount according to claim 3, further comprising fastening means for fixing said circular disk to said bottom wall portion of said base member such that said solid cylinder is tightly gripped by and between said circular disk and said bottom wall portion.

7. A fluid-filled elastic mount according to claim 3, further comprising bonding means for bonding together said circular disk, said solid cylinder of said permanent magnet and said bottom wall portion of said base member.

8. A fluid-filled elastic mount according to claim 1, wherein said permanent magnet consists of an annular magnet having a center bore, and said annular gap is formed radially inwardly of an inner circumferential surface of said annular magnet.

9. A fluid-filled elastic mount according to claim 8, wherein said first yoke member includes a base plate portion and a cylinder portion which extends through said center bore of said annular magnet, from a central part of said base plate portion, said base plate portion having an outer annular part in contact with one of opposite axial ends of said annular magnet, said second yoke member comprising an annular member in contact with the other of said opposite axial ends of said annular magnet, said annular member having an inner circumferential surface which cooperates with an outer circumferential surface of said cylinder portion of said first yoke member to define therebetween said annular gap.

10. A fluid-filled elastic mount according to claim 8, wherein said fluid chamber comprises a pressure-receiving chamber, and said elastic body further partially defines an equilibrium chamber, said elastic mount further comprising means for defining an orifice passage for fluid communication between said pressure-receiving and equilibrium chamber, said orifice passage being tuned to damp a vibrational load having a frequency within a predetermined range, based on resonance of said non-compressible fluid flowing through said orifice passage upon application of said vibrational load between said first and second supports.

11. A fluid-filled elastic mount according to claim 10, wherein said first support consists of an inner sleeve, and said second support consists of an outer sleeve disposed radially outwardly of said inner sleeve.

12. A fluid-filled elastic mount according to claim 11, wherein said fluid chamber further comprises an auxiliary fluid chamber communicating with said pressure-receiving chamber, said auxiliary fluid chamber being partially defined by said oscillating plate.

13. A fluid-filled elastic mount according to claim 12, further comprising means for cooperating with said oscillating plate to define said auxiliary fluid chamber.

14. A fluid-filled elastic mount according to claim 13, further comprising a mounting bracket for fixing said outer sleeve to one of two members which are connected to each other by the elastic mount in a vibration damping fashion, said mounting bracket also functioning as said means for cooperating with said oscillating plate to define said auxiliary fluid chamber.

15. A fluid-filled elastic mount according to claim 1, further comprising a movable member which is fixed to said oscillating plate and to which said annular coil is fixed to displace said oscillating plate with said movable member upon energization of said annular coil.

16. A fluid-filled elastic mount according to claim 1, further comprising elastic support member for elastically supporting said oscillating plate, so as to permit an oscillating movement of said oscillating plate by said annular coil.

17. A fluid-filled elastic mount according to claim 1, wherein said fluid chamber is a pressure-receiving chamber, and further comprising a flexible diaphragm which partially defines an equilibrium chamber, and means for defining an orifice passage for fluid communication between said pressure-receiving and equilibrium chambers, said orifice passage being tuned to damp a vibrational load having a frequency within a predetermined range, based on resonance of said non-compressible fluid flowing through said orifice passage upon application of said vibrational load between said first and second supports.

18. A fluid-filled elastic mount according to claim 17, wherein said first and second supports are spaced apart from each other by said elastic body in a load receiving direction in which said vibrational load is received.

19. A fluid-filled elastic mount according to claim 18, further comprising partition means for separating said pressure-receiving and equilibrium chambers from each other, said partition means and said flexible diaphragm being supported by said first support.

20. A fluid-filled elastic mount according to claim 19, wherein said partition means comprises a member which is supported by said partition means and which cooperates with said partition means to constitute said means for defining said orifice passage.

21. A method of manufacturing a fluid-filled elastic mount, comprising the steps of:
elastically connecting a first and second support to each other through an interposed elastic body;
elastically connecting an oscillating plate to one of said first and second supports to provide a fluid chamber defined by at least said elastic body;
fixing an annular moving coil to a first side of said oscillating plate opposite to a second side of said oscillating plate which faces said fluid chamber;
assembling an unmagnetized magnet assembly by providing a blank for a permanent magnet and connecting first and second yoke members to opposite end faces of said blank to define an annular gap between said first and second yoke members;

magnetizing said blank to provide a permanent magnet in said magnet assembly, such that said permanent magnet and said yoke members define a closed magnetic path including said annular gap; and attaching said magnet assembly to one of said first and second supports such that said permanent magnet is disposed on said first side of said oscillating plate, and said annular moving coil is axially displaceable within said annular gap to oscillate said oscillating plate upon energization of said moving coil.

22. A method according to claim 21, wherein said step of magnetizing said blank comprises disposing a coil around said blank, and energizing said coil.

23. A method according to claim 21, wherein said blank and said first and second yoke members comprise ferromagnetic materials.

24. A method according to claim 23, wherein said blank comprises one of an iron, steel alloy, and ferrite.

25. A method according to claim 21, wherein said blank consists of a solid cylinder, and said first yoke member comprises a base member including a bottom wall portion and a cylindrical wall portion which cooperates to define a cylindrical space, said second yoke member comprising a circular disk, said step of assembling to prepare said unmagnetized magnet assembly comprising placing said solid cylinder within said cylindrical space such that one of opposite axial ends of said solid cylinder is in contact with said bottom wall portion of said base member while the other of said opposite axial ends is in contact with said circular disk.

26. A method according to claim 25, wherein said first yoke member further comprises an annular member, said step of assembling to prepare said unmagnetized magnet assembly comprising fixing said annular member to said cylindrical wall portion of said base member, such that an inner circumferential surface of said annular member cooperates with an outer circumferential surface of said circular disk to define therebetween said annular gap.

27. A method according to claim 25, wherein said cylindrical wall portion of said base member has an annular protrusion extending radially inwardly from one of opposite axial ends thereof remote from said bottom wall portion, said step of assembling to prepare said unmagnetized magnet assembly comprising positioning said base member relative to said circular disk such that an inner circumferential surface of said annular protrusion cooperates with an outer circumferential surface of said circular disk to define therebetween said annular gap.

28. A method according to claim 21, wherein said blank consists of an annular blank having a center bore, and said first yoke member includes a base plate portion and a cylinder portion which extends from a central part of said base plate portion, said second yoke member comprising an annular member, said step of assembling to prepare said unmagnetized magnet assembly comprising positioning said first yoke member such that an outer part of said base plate portion is in contact with one of opposite axial ends of said annular blank and said cylinder portion extends through said center bore of said annular blank, while said annular member is in contact with the other of said opposite axial ends of said annular blank, and such that an inner circumferential surface of said annular member cooperates with an outer circumferential surface of said cylinder portion of said first yoke member to define therebetween said annular gap.

* * * * *